US011646656B2

(12) United States Patent
Zhang et al.

(10) Patent No.: US 11,646,656 B2
(45) Date of Patent: May 9, 2023

(54) MULTI-LEVEL CONVERTER WITH VOLTAGE DIVIDER FOR PRE-CHARGING FLYING CAPACITOR

(71) Applicant: Efficient Power Conversion Corporation, El Segundo, CA (US)

(72) Inventors: Yuanzhe Zhang, Torrance, CA (US); Michael A. de Rooij, Playa Vista, CA (US); Jianjing Wang, Mountain View, CA (US)

(73) Assignee: Efficient Power Conversion Corporation, El Segundo, CA (US)

( * ) Notice: Subject to any disclaimer, the term of this patent is extended or adjusted under 35 U.S.C. 154(b) by 206 days.

(21) Appl. No.: 17/083,405

(22) Filed: Oct. 29, 2020

(65) Prior Publication Data

US 2021/0135567 A1    May 6, 2021

Related U.S. Application Data

(60) Provisional application No. 62/931,406, filed on Nov. 6, 2019.

(51) Int. Cl.
| | |
|---|---|
| *H02M 3/07* | (2006.01) |
| *H02M 3/158* | (2006.01) |
| *H02M 7/483* | (2007.01) |
| *H02M 1/36* | (2007.01) |
| *H02M 3/06* | (2006.01) |

(52) U.S. Cl.
CPC ............ *H02M 3/07* (2013.01); *H02M 3/158* (2013.01); *H02M 7/4837* (2021.05); *H02M 1/36* (2013.01); *H02M 3/06* (2013.01); *H02M 7/483* (2013.01)

(58) Field of Classification Search
CPC ............ H02M 1/08; H02M 1/36; H02M 3/06; H02M 3/07; H02M 3/156; H02M 3/158; H02M 7/483; H02M 7/4835; H02M 7/4837

See application file for complete search history.

(56) References Cited

U.S. PATENT DOCUMENTS

| | | | |
|---|---|---|---|
| 9,083,230 B2 | 7/2015 | Narimani et al. | |
| 9,318,974 B2 | 4/2016 | Yoscovich et al. | |
| 10,075,080 B1 * | 9/2018 | Scoones | H02M 3/158 |
| 10,447,158 B2 | 10/2019 | Chen et al. | |
| 10,615,697 B1 * | 4/2020 | Ferrari | H02M 7/4837 |
| 11,088,620 B1 * | 8/2021 | Arnold | H02M 3/158 |
| 2015/0318788 A1 | 11/2015 | Kovacic et al. | |

(Continued)

FOREIGN PATENT DOCUMENTS

| | | |
|---|---|---|
| CN | 109245581 A | 1/2019 |
| CN | 109474197 A | 3/2019 |

(Continued)

*Primary Examiner* — Matthew V Nguyen
(74) *Attorney, Agent, or Firm* — Blank Rome LLP

(57) ABSTRACT

A multi-level converter includes a flying capacitor and a resistive voltage divider. The multi-level converter is configured to convert an input voltage into an output voltage. The resistive voltage divider is configured to charge a flying capacitor in the multi-level converter during an initial charging mode of operation. In some implementations, the multi-level converter includes a plurality of flying capacitors and a plurality of resistive voltage dividers including a resistive voltage divider for each flying capacitor in the plurality of flying capacitors.

9 Claims, 3 Drawing Sheets

(56) References Cited

U.S. PATENT DOCUMENTS

| | | | |
|---|---|---|---|
| 2017/0012554 A1 | 1/2017 | Pu et al. | |
| 2018/0006559 A1* | 1/2018 | Chen | H02M 3/158 |
| 2019/0058405 A1 | 2/2019 | Lazaro et al. | |
| 2019/0089252 A1 | 3/2019 | Li et al. | |
| 2019/0131886 A1 | 5/2019 | Bassi et al. | |
| 2019/0140476 A1 | 5/2019 | Mondal | |
| 2019/0379287 A1* | 12/2019 | Zhang | H02M 3/07 |
| 2020/0195133 A1* | 6/2020 | Bonnano | H02M 3/158 |
| 2021/0057999 A1* | 2/2021 | Prodic | H02M 3/158 |

FOREIGN PATENT DOCUMENTS

| | | | | |
|---|---|---|---|---|
| CN | 107112892 B | | 9/2019 | |
| CN | 110601584 | * | 12/2020 | H02M 7/797 |
| CN | 112491255 | * | 3/2021 | H02M 3/155 |
| CN | 112928907 | * | 6/2021 | H02M 1/36 |
| EP | 2930839 A2 | | 10/2015 | |
| EP | 3202025 B1 | | 5/2020 | |
| JP | 2019-75915 A | | 5/2019 | |
| TW | 201916562 A | | 4/2011 | |
| TW | 201703418 A | | 1/2017 | |

* cited by examiner

MULTI-LEVEL CONVERTER WITH VOLTAGE DIVIDER FOR PRE-CHARGING FLYING CAPACITOR

This application claims the benefit of U.S. Provisional Application No. 62/931,406, filed on Nov. 6, 2019, the entire disclosure of which is hereby incorporated by reference.

BACKGROUND

1. Field of the Invention

The present invention relates generally to systems and methods of pre-charging a flying capacitor for multi-level converters, and more particularly to a multi-level converter for pre-charging a flying capacitor at start-up.

2. Description of the Related Art

In typical N-level converters and during steady state operation, it is relatively easy to maintain a voltage approximately 1/(N−1) of the input voltage across a flying capacitor. However, during start-up, the flying capacitor must be pre-charged before the multi-level converter can operate in a steady state. Until the positive terminal of the flying capacitor is charged to the desired voltage, the multi-level converter may experience faults and other kinds of failures. Many multi-level converters include independent charging circuitry to pre-charge the flying capacitor during start-up to achieve the desired voltage. The additional charging circuitry increases the circuit complexity and area of the multi-level converter in an integrated circuit. In addition, the independent charging circuitry complicates control of the multi-level converter.

SUMMARY OF THE INVENTION

The present invention addresses the disadvantages of circuit and control complexity and large area associated with independent charging circuits for pre-charging flying capacitors in conventional multi-level converters discussed above, by providing a resistive voltage divider for pre-charging the flying capacitor. The present invention, as described herein, comprises a multi-level converter with a resistive voltage divider configured to pre-charge a flying capacitor during an initial charging phase. Once the flying capacitor is charged to the appropriate voltage, the multi-level converter transitions to a normal operating mode. The resistive voltage divider comprises passive components which occupy less area than an independent charging circuit. In addition, the passive components simplify control of the multi-level converter compared to incorporation of an independent charging circuit into the multi-level converter.

The multi-level converter is an N-level converter and comprises N-1 upper transistors and N-1 lower transistors, N-2 flying capacitors, and N-2 resistive voltage dividers. The upper transistors are connected in series with each other and with the lower transistors, which are also connected in series with each other. Each flying capacitor is connected across one or more of the upper transistors and one or more of the lower transistors. Each resistive voltage divider is connected to one of the flying capacitors and is configured to charge the respective flying capacitor during an initial charging phase of operation.

Each resistive voltage divider comprises a first resistor and a second resistor. The ratio of the resistance of the first resistor to the resistance of the second resistor is chosen based on a desired voltage on the positive terminal of the flying capacitor. The resistances of both resistors are chosen to adjust the charging speed of the flying capacitor. A controller enables a charging path from the resistive voltage divider through the flying capacitor to a ground node during the initial charging phase of operation and monitor the voltage on the positive terminal of the flying capacitor. In response to the voltage on the positive terminal of the flying capacitor satisfying a voltage criterion, the controller may transition the multi-level converter from the initial charging phase of operation to a steady state phase of operation.

The above and other preferred features described herein, including various novel details of implementation and combination of elements, will now be more particularly described with reference to the accompanying drawings and pointed out in the claims. It should be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE PREFERRED EMBODIMENTS

In the following detailed description, reference is made to certain embodiments. These embodiments are described with sufficient detail to enable those skilled in the art to practice them. It is to be understood that other embodiments may be employed and that various structural, logical, and electrical changes may be made. The combinations of features disclosed in the following detailed description may not be necessary to practice the teachings in the broadest sense, and are instead taught merely to describe particularly representative examples of the present teachings.

Figure 1:
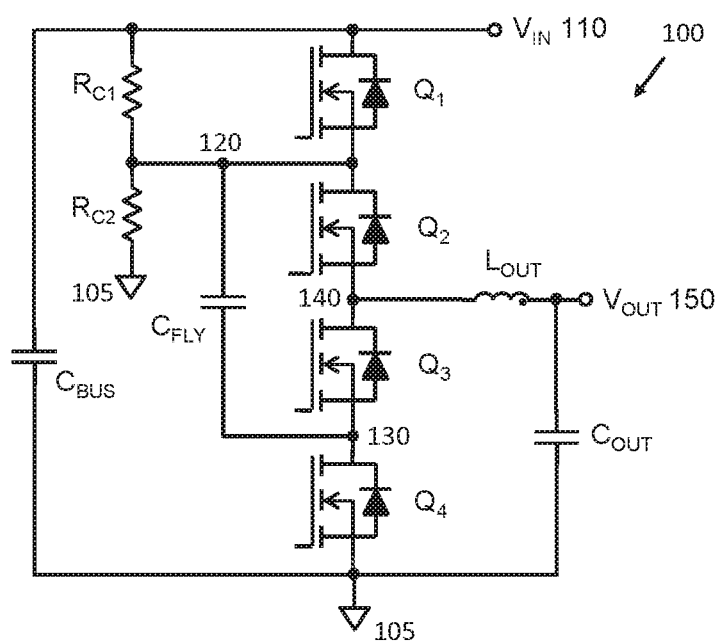
FIG. 1 illustrates a schematic of a three-level converter with a flying capacitor according to an exemplary embodiment of the present invention.

FIG. 1 illustrates a schematic of a three-level converter 100 with a flying capacitor $C_{FLY}$ according to an exemplary embodiment of the present invention. The three-level converter 100 includes two upper transistors Q1, Q2 and two lower transistors Q3, Q4, capacitors $C_{FLY}$, $C_{BUS}$, and $C_{OUT}$, resistors $R_{C1}$ and $R_{C2}$, and inductor $L_{OUT}$. Transistors Q1-Q4 comprise n-type field effect transistors (FETs). In some implementations, transistors Q1-Q4 are gallium nitride (GaN) FETs, metal oxide semiconductor (MOS) FETs, bipolar junction transistors (BJTs), or any appropriate type or combination of transistors.

The upper level transistors Q1, Q2 are connected in series with each other, and are connected in series with the lower level transistors, Q3, Q4, which are also connected in series with each other. The drain terminal of Q1 is connected to an input node 110 configured to receive $V_{IN}$, and the source terminal of Q4 is connected to ground 105. Capacitor $C_{BUS}$ is connected to the input node 110 and to ground 105. Capacitor $C_{FLY}$ is connected between Q1 and Q2 at node 120 and between Q3 and Q4 at node 130.

Resistor $R_{C1}$ is connected to the input node 110 and to capacitor $C_{FLY}$ and between transistors Q1 and Q2 at node 120. Resistor $R_{C2}$ is connected to capacitor $C_{FLY}$ and between transistors Q1 and Q2 at node 120 and to ground 105. Resistor $R_{C1}$ works in tandem with resistor $R_{C2}$ to act as a resistive voltage divider. The ratio of resistor $R_{C1}$ to resistor $R_{C2}$ is used to determine a voltage at the node 120 and the positive terminal of capacitor $C_{FLY}$. Inductor $L_{OUT}$ is connected between transistors Q2 and Q3 at node 140 and to output node 150 configured to provide $V_{OUT}$. Capacitor $C_{OUT}$ is connected to output node 150 and to ground 105.

In response to being powered on, three-level converter 100 operates in an initial charging mode of operation in which the capacitor $C_{FLY}$ is charged. During the initial charging mode, transistor Q4 is turned on to provide a charging path for capacitor $C_{FLY}$ from the input node 110, through the resistive voltage divider of $R_{C1}$ and $R_{C2}$, to capacitor $C_{FLY}$ before reaching ground 105 through transistor Q4. A ratio of the resistance of $R_{C1}$ to the resistance of $R_{C2}$ is chosen based on the expected input voltage $V_{IN}$ such that the capacitor $C_{FLY}$ is charged until a voltage at the node 120 and the positive terminal of capacitor $C_{FLY}$ is approximately half the input voltage $V_{IN}$ or slightly greater than half the input voltage $V_{IN}$ to accommodate leakage from transistors Q1-Q4. The value of the resistances is also chosen to control a charging current to capacitor $C_{FLY}$ and the length of time needed to charge it. Once the capacitor $C_{FLY}$ is charged, three-level converter 100 transitions to a normal operating mode, and the voltage on the positive terminal of capacitor $C_{FLY}$ is maintained at approximately half the input voltage $V_{IN}$.

In contrast to conventional multi-level converters which use an independent power system to charge capacitor $C_{FLY}$ before steady state operation, the three-level converter 100 uses passive components in the resistive voltage divider which occupy a much smaller area than an independent charging system. In addition, resistors $R_{C1}$ and $R_{C2}$ do not add complexity to control of three-level converter 100. In some embodiments, the resistor $R_{C2}$ is already included in a conventional three-level converter as a voltage-sensing resistor to provide voltage information to a controller, such that the only added component included to make a resistive voltage divider for charging the flying capacitor is the resistor $R_{C1}$.

Figure 2:
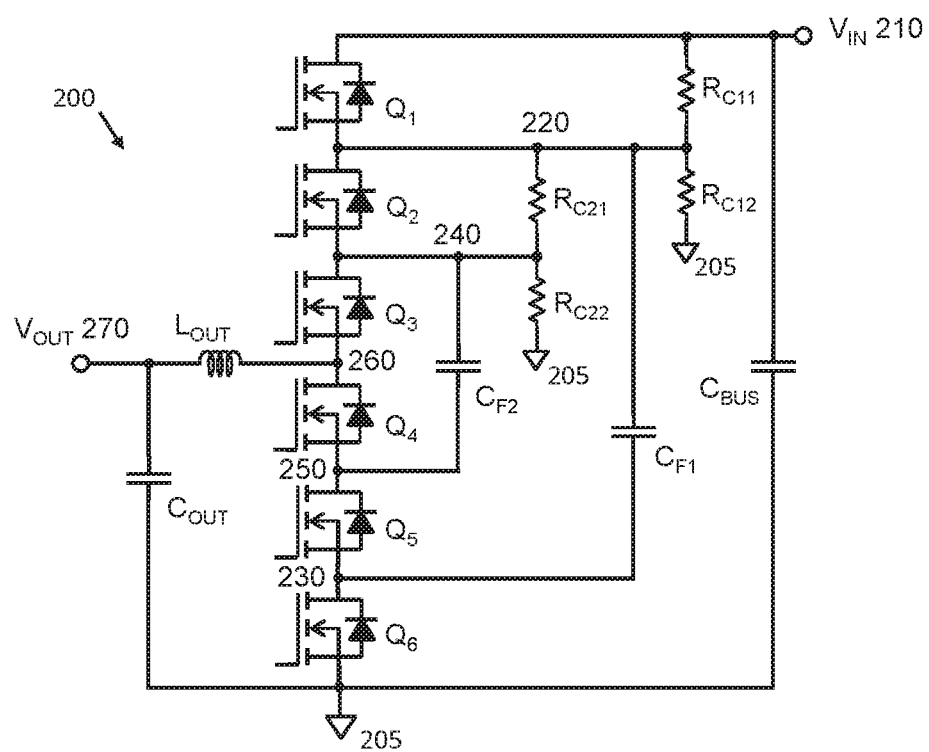
FIG. 2 illustrates a schematic of a four-level converter with two flying capacitors according to an exemplary embodiment of the present invention.

The resistive voltage divider used to charge the flying capacitor can be extended from a three-level converter to other multi-level converters and to multi-level inverters. An N-level flying capacitor multi-level converter includes (N-1) upper transistors and (N-1) lower transistors, (N-2) flying capacitors, and (N-2) resistive voltage dividers. FIG. 2 illustrates a schematic of a four-level converter 200 with two flying capacitors $C_{F1}$ and $C_{F2}$ according to an exemplary embodiment of the present invention.

The four-level converter 200 of FIG. 2 is similar to three-level converter 100 shown in FIG. 1, but includes additional transistors Q5 and Q6, an additional flying capacitor $C_{F2}$, and an additional resistive voltage divider including resistors $R_{C21}$ and $R_{C22}$. Similar to three-level converter 100, four-level converter 200 uses passive components $R_{C11}$ and $R_{C12}$ in the first resistive voltage divider and $R_{C21}$ and $R_{C22}$ in the second resistive voltage divider to charge the flying capacitors $C_{F1}$ and $C_{F2}$ and reduce power consumption compared to an independent power system.

Transistors Q1-Q6 comprise n-type FETs and are connected together in series. The drain terminal of Q1 is connected to an input node 210 configured to receive $V_{IN}$, and the source terminal of Q6 is connected to ground 205. Capacitor $C_{BUS}$ is connected to the input node 210 and to ground 205. Capacitor $C_{F1}$ is connected between Q1 and Q2 at node 220 and between Q5 and Q6 at node 230. Resistor $R_{C11}$ is connected to the input node 210 and to capacitor $C_{F1}$ and between transistors Q1 and Q2 at node 220. Resistor $R_{C12}$ is connected to capacitor $C_{F1}$ and between transistors Q1 and Q2 at node 220 and to ground 205. Resistor $R_{C11}$ works in tandem with resistor $R_{C12}$ as a resistive voltage divider to charge the first flying capacitor $C_{F1}$.

Capacitor $C_{F2}$ is connected between Q2 and Q3 at node 240 and between Q4 and Q5 at node 250. Resistor $R_{C21}$ is connected to node 220 and to capacitor $C_{F2}$ at node 240. Resistor $R_{C22}$ is connected to capacitor $C_{F2}$ at node 240 and to ground 205. Resistor $R_{C21}$ works in tandem with resistor $R_{C22}$ as a resistive voltage divider to charge the second flying capacitor $C_{F2}$. Inductor $L_{OUT}$ is connected between transistors Q3 and Q4 at node 260 and to output node 270 configured to provide $V_{OUT}$. Capacitor $C_{OUT}$ is connected to output node 270 and to ground 205.

In response to being powered on, four-level converter 200 operates in an initial charging mode of operation in which the flying capacitors $C_{F1}$ and $C_{F2}$ are charged. During the initial charging mode, transistor Q6 is turned on to provide a charging path for capacitor $C_{F1}$ from the input node 210, through the resistive voltage divider of $R_{C11}$ and $R_{C12}$, to capacitor $C_{F1}$ before reaching ground 205. Capacitor $C_{F1}$ is charged until a voltage at the node 220 and the positive terminal of capacitor $C_{F1}$ is approximately two-thirds of the input voltage $V_{IN}$ or slightly greater than two-thirds of the input voltage $V_{IN}$ to accommodate leakage from transistors Q1-Q6.

Once the capacitor $C_{F1}$ is charged or while the capacitor $C_{F1}$ is charging, transistor Q5 is turned on to provide a charging path for capacitor $C_{F2}$ from the input node 210, through the first resistive voltage divider of $R_{C11}$ and $R_{C12}$, through the second resistive voltage divider of $R_{C21}$ and $R_{C22}$, to capacitor $C_{F2}$ before reaching ground 205 through transistors Q5 and Q6. Capacitor $C_{F2}$ is charged until a voltage at the node 240 and the positive terminal of capacitor $C_{F2}$ is approximately one third of the voltage at node 220 or slightly greater than one third of the voltage at node 220 to accommodate leakage from transistors Q1-Q6. Once the capacitor $C_{F2}$ is charged, four-level converter 200 transitions to a normal operating mode, and the voltage on the positive terminal of capacitor $C_{F1}$ and the voltage on the positive terminal of capacitor $C_{F2}$ are maintained at their respective values.

Figure 3:
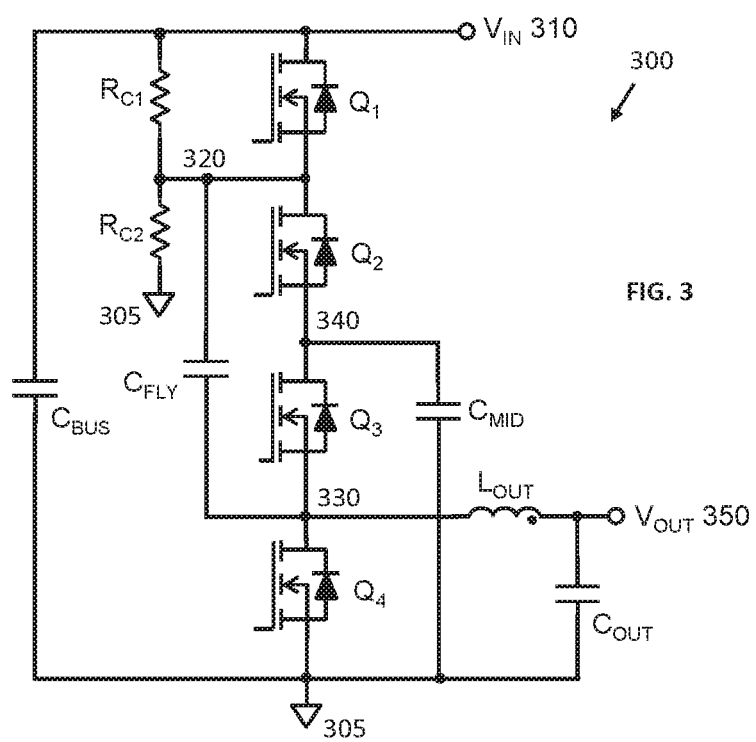
FIG. 3 illustrates a schematic of a hybrid converter with a flying capacitor according to an exemplary embodiment of the present invention.

In addition to multilevel converters with three or more levels, the resistive voltage divider used to charge the flying capacitor can be extended to hybrid converters combining multilevel converters with other types of converters such as buck-boost converters, bootstrap converters, and the like. FIG. 3 illustrates a schematic of a hybrid converter 300 combining a converter and a synchronous buck according to an exemplary embodiment of the present invention. Hybrid converter 300 is similar to three-level converter 100 shown in FIG. 1, but also includes a capacitor $C_{MID}$ connected between transistors Q2 and Q3 at node 340. In addition, the inductor $L_{OUT}$ is connected between transistors Q3 and Q4 at node 330, rather than at node 340. Hybrid converter 300 includes the resistive voltage divider of resistors $R_{C1}$ and $R_{C2}$ which charges capacitor $C_{FLY}$ through transistor Q4 during an initial charging phase.

The above description and drawings are only to be considered illustrative of specific embodiments, which achieve the features and advantages described herein. Modifications and substitutions to specific process conditions can be made. Accordingly, the embodiments of the invention are not considered as being limited by the foregoing description and drawings.

What is claimed is:

1. A multi-level converter configured to convert an input voltage into an output voltage, comprising:
    two upper level transistors connected in electrical series with a node therebetween;
    two lower level transistors, wherein the two upper level transistors and the two lower level transistors are connected together in electrical series between the input voltage and ground,
    a flying capacitor connected to the node between the two upper level transistors; and
    a resistive voltage divider configured to passively charge the flying capacitor, without opening or closing any switches, during an initial charging mode of operation, wherein the resistive voltage divider consists of a first resistor and a second resistor connected in electrical series between the input voltage and ground, with a node therebetween, the node between the first resistor and the second resistor being connected to the flying capacitor and to the node between the two upper level transistors, wherein the second resistor is a voltage-sensing resistor for providing voltage information to a controller.

2. The multi-level converter of claim 1, wherein the multi-level converter comprises a plurality of flying capacitors, and wherein the multi-level converter further comprises a resistive voltage divider connected to each flying capacitor.

3. The multi-level converter of claim 1, wherein a ratio of a resistance of the first resistor to a resistance of the second resistor is chosen based on a desired voltage on a positive terminal of the flying capacitor.

4. The multi-level converter of claim 1, wherein a resistance of the first resistor and a resistance of the second resistor are chosen to control a charging speed of the flying capacitor.

5. The multi-level converter of claim 1, wherein the multi-level converter comprises the second resistor to sense a voltage on a positive terminal of the flying capacitor for controlling the multi-level converter.

6. The multi-level converter of claim 1, further comprising a controller, wherein during the initial charging mode of operation, the controller is configured to enable a charging path from the resistive voltage divider through the flying capacitor to a ground node.

7. The multi-level converter of claim 6, wherein the controller is further configured to cause the multi-level converter to transition from the initial charging mode of operation to a normal mode of operation when the voltage across the flying capacitor satisfies a voltage criterion.

8. An N-level flying capacitor multi-level converter, comprising:
    N-1 upper transistors connected in series, with a node between each of the upper transistors;
    N-1 lower transistors connected in series, wherein the N-1 lower transistors are connected in series with the N-1 upper transistors between an input voltage and ground;
    N-2 flying capacitors, each flying capacitor connected to one of the nodes between each of the upper transistors; and
    N-2 resistive voltage dividers, each voltage divider being configured to passively charge one of the flying capacitors without opening or closing any switches, each resistive voltage divider consisting of a first resistor and a second resistor connected in electrical series between the input voltage and ground with a node therebetween, the node between the first resistor and the second resistor being connected to the one of the flying capacitors that the voltage divider is configured to charge and to the one node between the upper transistors connected to the one of the flying capacitors, wherein the second resistor is a voltage-sensing resistor for providing voltage information to a controller.

9. The flying capacitor multi-level converter of claim 8, wherein the resistive voltage dividers are configured to charge the flying capacitors during an initial charging phase of operation.

* * * * *